Dec. 13, 1927.
W. B. HAUSMAN
EGG CANDLING DEVICE
Filed Sept. 25, 1925
1,652,983
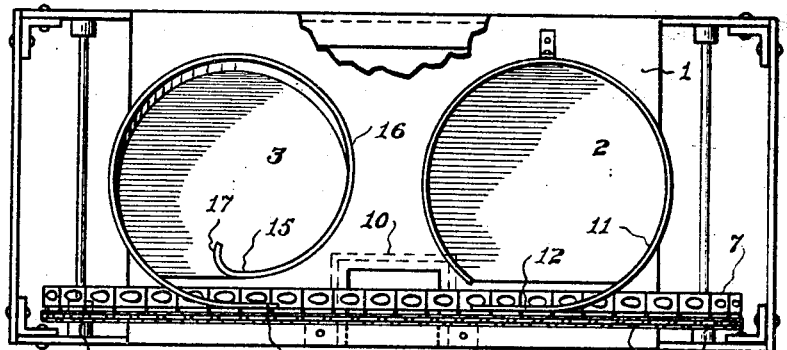
Fig. 1.
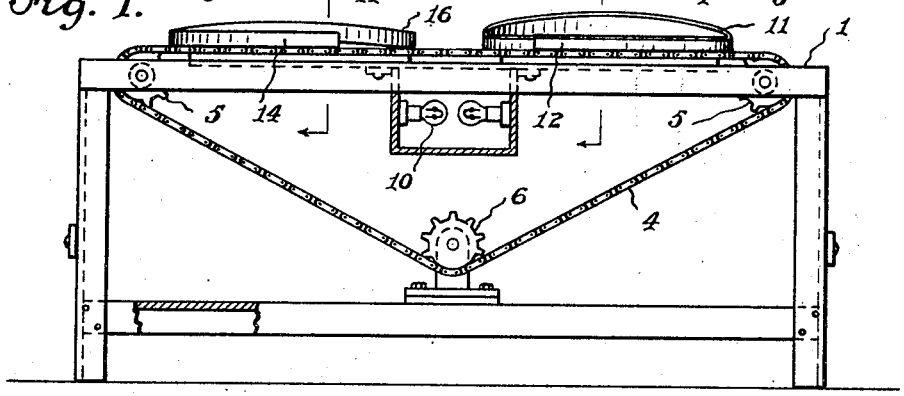
Fig. 2.
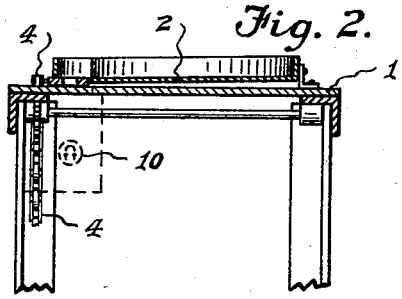
Fig. 3.
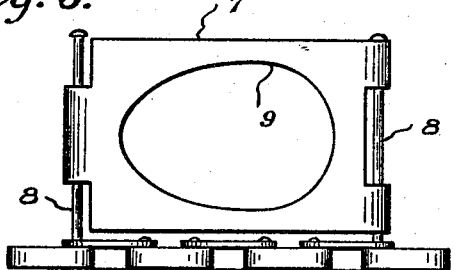
Fig. 4.
Fig. 5.
Ward B. Hausman
INVENTOR
BY Victor J. Evans
ATTORNEY Patented Dec. 13, 1927.

1,652,983

UNITED STATES PATENT OFFICE.

WARD B. HAUSMAN, OF PHILADELPHIA, PENNSYLVANIA.

EGG-CANDLING DEVICE.

Application filed September 25, 1925. Serial No. 58,671.

This invention relates to a device for candling eggs, and an object of the invention is to provide a construction which will permit the rapid and accurate candling of the eggs and enable one person to candle a relatively large number of eggs in a comparatively short time.

Another object of the invention is to provide an egg candling device in which the eggs are fed without the use of the hands of the operator to the lights for candling and removed from the device without handling— permitting the operator to use his hands for any purpose desired, eliminating the extra handling of the eggs and consequently materially decreasing liability of breakage of the eggs during candling.

Other objects of the invention will appear in the following detail description, and in the accompanying drawings wherein:

Figure 1 is a top plan of the egg candling device.

Figure 2 is a side elevational view of the improved egg candling device. Figure 3, is a fragmentary sectional view of one of the inclined flange surrounded portions.

Figure 4 is a transverse sectional view through the egg candling device.

Figure 5 is a plan view of a portion of the chain 4 showing one of the flights 7.

Referring more particularly to the drawings, the improved egg candling device comprises a table 1 which has circular inclined portions 2 and 3 at its opposite ends. The inclined portion 3 inclines transversely across the table towards the endless egg carrying chain 4, while the inclined portion 3 inclines away from the endless egg carrying chain 4. The chain 4 passes about suitable sprockets 5 and is adapted to be moved over the sprockets by a suitable driving sprocket 6 to which any suitable type of prime mover may be connected. The chain 4 has a plurality of laterally extending flights 7 attached thereto which project from the chain laterally towards the table top 1. The flights 7 are attached to the chain by rods 8 which form certain of the pivot or connecting pins of the chain structure. The flights 7 are provided with openings 9 into which the eggs to be candled pass. The openings are smaller than an egg so that an egg will be supported by each flight, and during the passage of the chain, the eggs will pass over the light 10 which may be in the form of electric lamp bulbs or other suitable lights, and as the eggs pass over the lights, they may be candled to determine their edibility. The inclined portion 2 is surrounded by an upstanding guide 11 which curves towards the chain 4 for guiding the eggs upon the flights 7. A guard rail 12 extends partly along the outer edge of the chain at the receiving end so as to prevent the eggs from rolling off the flights during their initial engagement with the flights and until they come to rest in the various openings 9. After the eggs have passed over the candling lights 10, they are rolled off the flights by the guard 14, which curves gradually across the flights and is spaced from the inner end 15 of the surrounding flange 16, which surrounds the inclined portion 3, so as to provide an entrance to the space confined within the flange 6 and into which the eggs are rolled, as they are taken from the flights by the guard 14. The end 17 of the flange 16 is curved inwardly, so as to prevent the eggs from rolling back upon the flights.

It is, of course, to be understood, that the invention may be constructed in various other manners and the parts associated in different relations, and therefore, I do not desire to be limited in any manner, except as set forth in the claims hereunto appended.

What I claim is:—

1. In an egg candling device, an egg carrying endless conveyor chain, an egg supporting platform inclining towards the conveyor and adapted to permit eggs to roll upon the conveyor, a guard extending along part of the conveyor to prevent eggs from rolling therefrom, a table, a guard curving across the conveyor at a point remote from said supporting platform, and an arcuate upstanding flange connected to said guard, and resting on said table to provide a receiving space for receiving the eggs from the conveyor.

2. In an egg candling device, an egg carrying endless conveyor chain, an inclined egg supporting platform inclining towards the conveyor and adapted to permit eggs to roll upon the conveyor, a guard extending along part of the conveyor to prevent eggs from rolling therefrom, a table, a pair of flange guards disposed across the conveyor at spaced points remote from said supporting platform, said flange guards providing a continuation thereof, to provide arcuate enclosures and resting on said table to provide an open circular space for receiving the eggs from the conveyor, said conveyer comprising a plurality of flights each provided with an egg receiving opening, candling lights, and means for moving the conveyer over the candling lights.

In testimony whereof I affix my signature.

WARD B. HAUSMAN.